July 25, 1961
W. H. BIXBY
2,994,029
CURRENT SUPPLY APPARATUS
Filed June 10, 1958
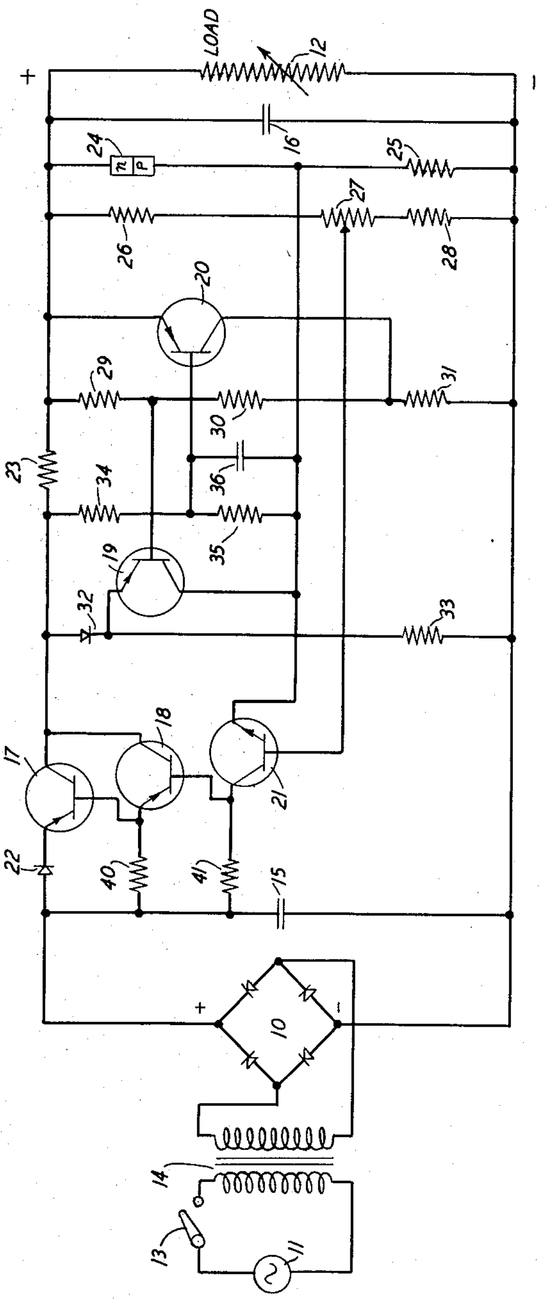
INVENTOR
W. H. BIXBY
BY
G. F. Heuerman
ATTORNEY 2,994,029
CURRENT SUPPLY APPARATUS William H. Bixby, Columbus, Ohio, assignor to International Business Machines Corporation, New York, N.Y., a corporation of New York Filed June 10, 1958, Ser. No. 741,043
9 Claims. (Cl. 323—9)

This invention relates to current supply apparatus and more particularly to overload protection of series transistor regulated current supply apparatus.

An object of the invention is to provide improved apparatus for preventing overloading of a current supply circuit.

A more specific object of the invention is to provide improved means for reducing the load voltage when the current supplied through a series transistor regulator to the load exceeds a predetermined amplitude.

This invention is an improvement over the invention disclosed and claimed in United States Patent No. 2,774,930, granted to me December 18, 1956.

In a specific embodiment of the invention herein shown and described for the purpose of illustration, current is supplied from a direct current supply source through a path comprising a regulating transistor and a resistor in series to a load. A p–n junction diode and a resistor in series are connected across the load for deriving a constant reference voltage across the diode. A transistor amplifier upon which is impressed a control voltage equal to the difference of the constant reference voltage and a portion of the load voltage is provided for controlling the emitter-collector resistance of the series regulating transistor, thereby controlling the current supplied to the load and minimizing load voltage changes when the load current is within a normal operating range including a predetermined maximum amplitude.

For protecting the series regulating transistor and the load against excessive load current, there are provided a resistor through which the load current flows and a bistable or flip-flop circuit comprising a first transistor which is normally non-conductive and a second transistor which is normally conductive. The resistor and the emitter-collector path of the first transistor in series are in a shunt path across the constant voltage device. When the load current increases to an amplitude above said predetermined maximum value, the second transistor is made non-conductive and the first transistor is made conductive. As a result, the voltage across the constant voltage device decreases abruptly, the resistance of the emitter-collector path of the series regulating transistor increases and the load voltage abruptly decreases.

The invention will now be described in greater detail with reference to the accompanying drawing the single figure of which is a schematic view of a current supply circuit embodying the invention.

Referring now to the drawing, there is provided a bridge rectifier 10 for rectifying current from an alternating current supply source 11 and for supplying the rectified current to a load 12 which may vary. The alternating current source 11 may be connected through a switch 13 to the primary of a transformer 14 the secondary of which is connected to the input terminals of the rectifier 10. A filter condenser 15 is connected across the output terminals of rectifier 10 and a filter condenser 16 is connected across the load 12.

There are provided a plurality of p–n–p type transistors 17, 18, 19, and 20 and an n–p–n type transistor 21 each having a collector, an emitter and a base. The negative terminal of rectifier 10 is directly conductively connected to the negative load terminal. The positive rectifier terminal is connected through an asymmetrically conducting varistor 22 in its forward or low resistance direction to the emitter of transistor 17 and the collectors of transistors 17 and 18 are connected through a resistor 23 to the positive load terminal. The direction of the current flow through resistor 23 is such that its positive terminal is connected to the collector of transistor 17 and its negative terminal is connected to the positive load terminal. A plurality of shunt current paths are connected across the load. A first of these shunt paths comprises a constant voltage, p–n junction diode 24 and a resistor 25 in series. A second of the shunt paths comprises a resistor 26, a potentiometer 27 and a resistor 28, all in series. The third shunt path comprises resistors 29, 30 and 31, all in series. The common terminal of constant voltage diode 24 and resistor 25 is connected to the emitter of transistor 21. The variable tap of potentiometer 27 is connected to the base of transistor 21.

The base of transistor 17 and the emitter of transistor 18 are connected through a resistor 40 to the positive terminal of rectifier 10. The base of transistor 18 and the collector of transistor 21 are connected through a resistor 41 to the positive rectifier terminal. The positive terminal of resistor 23 is connected through an asymmetrically conducting varistor 32 in its forward or low resistance direction and a resistor 33 in series to the negative rectifier terminal. The emitter of transistor 19 is connected to the common terminal of varistor 32 and resistor 33, the base of transistor 19 is connected to the common terminal of resistors 29 and 30 and the collector of transistor 19 is connected to the common terminal of the constant voltage diode 24 and resistor 25. A current path comprising resistors 34 and 35 in series connects the positive terminal of resistor 23 to the common terminal of the diode 24 and resistor 25. A condenser 36 is connected across the resistor 35. The emitter of transistor 20 is connected to the negative terminal of resistor 23, the base of transistor 20 is connected to the common terminal of resistors 34 and 35 and the collector of transistor 20 is connected to the common terminal of resistors 30 and 31. The voltage drop across varistor 22 biases the emitter of transistor 17 negatively with respect to its base and the voltage drop across varistor 32 biases the emitter of transistor 19 negatively with respect to its base.

If the load voltage should increase, for example, the base of transistor 21 will become relatively more negative or less positive with respect to its emitter to cause the current flowing through resistor 41 into the collector to decrease. Therefore, the current flowing through resistor 40 into the emitter and out of the base and collector electrodes of transistor 18 will decrease. As a result, the current flowing from rectifier 10 through varistor 22 into the emitter and out of the base and collector electrodes of transistor 17 will decrease. The initially assumed increase of load voltage will thus be minimized.

When the circuit is initially energized by closure of switch 13, current from rectifier 10 will flow through resistor 23, into the emitter and out of the base of transistor 20, through resistor 35 and condenser 36 in parallel to charge the condenser and through resistor 25 to the negative load terminal. Current thus flows out of the collector of transistor 20 and through resistor 31. The resultant voltage drop across the emitter-collector path of transistor 20 will be held to a very low value. At the same time, the voltage drop across the diode 32 will bias the emitter of transistor 19 negatively with respect to its base to thereby reduce its collector current to a negligibly small value compared to the current normally flowing through the constant voltage diode 24. The bistable, flip-flop circuit comprising transistors 19 and 20 thus has no effect upon the operation of the voltage regulating circuit when the load current is within a normal operating range, as described above.

It will be noted that the emitter-base circuit of transistor 19 comprises diode 32, resistor 23 and resistor 29, all in series, and that the emitter-base circuit of transistor 20 comprises resistors 23 and 34 in series. If the load current flowing through resistor 23 should increase to an amplitude above the maximum amplitude of the normal range of load current, the increased voltage drop across resistor 23 will cause the emitter of transistor 19 to become positive with respect to its base. At the same time, the base of transistor 20 will become positive with respect to its emitter due in part to the increased voltage drop across resistor 23 and in part to the decreased voltage drop across resistor 34 which results when transistor 19 becomes conducting. The greatly reduced voltage drop across the diode 24 which results when transistor 19 becomes conducting, makes the base of transistor 21 negative with respect to its emitter and, therefore, the bases of transistors 18 and 17 each positive with respect to their emitters so as to abruptly decrease the current supplied through transistor 17 to the load. The load current is thus limited to a value which will not damage the transistor 17 providing that resistor 23 has sufficient resistance to cause the load current to be so limited for the minimum voltage delivered between the collector of transistor 17 and the negative rectifier terminal when the diode 24 is completely shunted down by the conducting transistor 19.

Other types of bistable circuits could be used in the protection circuit, such as, circuits employing high speed electromagnetic relays having holding contracts, vacuum tubes or gas discharge tubes. However, for the protection of transistor circuitry, a bistable transistor flip-flop circuit such as the one comprising transistors 19 and 20 appears to be preferable.

What is claimed is:

1. In combination, means for supplying current from a current supply source through a load circuit to a load, means comprising a current path having impedance connected across said load for deriving a control voltage, means in said load circuit responsive to said control voltage for controlling the voltage across said load to minimize load voltage changes when the load current is within a normal operating range including a predetermined maximum value, and means responsive to load current in excess of said maximum value for changing said control voltage to cause said load voltage to be abruptly reduced, said last mentioned means comprising means for shunting a portion only of said current path to reduce the impedance of said portion of the current path.

2. Apparatus for supplying current from a supply source to a load comprising means connected across said load for deriving a control voltage, means responsive to said control voltage for regulating the current supplied to said load to minimize load voltage changes when the load current is within a normal operating range including a predetermined maximum value, additional means comprising a first and a second variable conductance device, means for making said first device conducting and said second device substantially non-conducting when the load current is within said normal operating range, means responsive to load current larger than said maximum value for making said first device substantially non-conducting and said second device conducting, and means responsive to the conductance of said second device for changing said control voltage to cause a reduction of said load voltage.

3. Apparatus for supplying current from a supply source to a load comprising means responsive to load voltage changes for minimizing said load voltage changes when the load current is within a normal operating range including a predetermined maximum value, additional means comprising a flip-flop circuit energized from said load circuit, said flip-flop circuit comprising a first current path which is conductive and a second current path which is non-conductive when the load current is within said normal operating range, means responsive to an increase of load current above said maximum value for making said first current path non-conductive and said second current path conductive, and means responsive to the conductance of said second current path for reducing said load voltage below its normal operating value.

4. Apparatus for supplying current from a supply source to a load circuit comprising a load, a resistor in series with said supply source and said load, means responsive to voltage changes across said load for minimizing said load voltage changes when the load current flowing through said resistor is within a normal operating range including a predetermined maximum value, a first and a second transistor each having an emitter, a collector and a base, a first and a second current path comprising the emitter-collector paths of said first and second transistors respectively connected across said load circuit, means for connecting the positive and negative terminals of said resistor to the base and emitter of said first transistor respectively, means for connecting the positive and negative terminals of said resistor to the emitter and base of said second transistor respectively, means for making said first transistor conductive and said second transistor non-conductive when the load current flowing through said resistor is within said normal operating range, means responsive to the voltage across said resistor when the load current increases to a value larger than said maximum value for making said first transistor non-conductive and said second transistor conductive, and means responsive to the conductance of said second transistor for reducing the load voltage below its normal operating value.

5. Apparatus for supplying current from a direct current supply source to a load circuit including a load comprising a current path connected across said load circuit, said path comprising in series a constant voltage device and a resistor, means responsive to the difference of the voltage across said constant voltage device and a portion of the load voltage for causing changes of load voltage to be minimized over a normal operating range of load current including a predetermined maximum value of load current, a current path connected across said constant voltage device comprising a variable conductance device, means for making said variable conductance device normally non-conductive when the load current is within said normal operating range, and means responsive to an increase of load current to an amplitude larger than said maximum value for reducing the voltage across said constant voltage device and thereby reducing said load voltage, said last means comprising means for making said variable conductance device conductive.

6. Apparatus for supplying current from a direct current supply source to a load circuit including a load comprising a current path connected across said load circuit, said current path comprising in series a constant voltage device and a resistor, means responsive to the difference of the voltage across said constant voltage device and a portion of the load voltage for causing changes of load voltage to be minimized over a normal operating range of load current including a predetermined maximum value of load current, a flip-flop circuit energized from said load circuit comprising a first transistor which is conductive and a second transistor which is non-conductive when the load current is within said normal operating range, each of said transistors comprising an emitter, a collector and a base, a current path connected across said constant voltage device comprising the emitter-collector path of said second transistor, and means responsive to an increase of load current to an amplitude larger than said maximum value for making said first transistor non-conductive and said second transistor conductive, thereby reducing the voltage across said constant voltage device and reducing said load voltage.

7. Apparatus for supplying current from a current supply source to a load circuit including a load comprising a first and a second transistor each having an emitter, a collector and a base, a first resistor, means for connecting the emitter-collector path of said first transistor and said first resistor in series with said current supply source and said load, a constant voltage device, a second resistor, a current path connected across said load comprising said constant voltage device and said second resistor in series, means for deriving a control voltage equal to the difference of the voltage across said constant voltage device and a portion of said load voltage, means responsive to said control voltage for controlling the voltage drop across the emitter-collector path of said first transistor to minimize changes of said load voltage, a shunt current path across said constant voltage device comprising the emitter-collector path of said second transistor, and means responsive to the voltage drop across said first resistor for controlling the conductance of the emitter-collector path of said second transistor.

8. Apparatus for supplying current from a current supply source to a load circuit including a load comprising a first, a second, and a third transistor each having an emitter, a collector and a base, a first varistor, a first resistor, means comprising said first varistor for connecting a terminal of said supply source to the emitter of said first transistor, means for connecting the collector of said first transistor to a first terminal of said first resistor, means for connecting the second terminal of said first resistor to a first terminal of said load, a constant voltage device having a first and a second terminal, a second resistor, a current path connected across said load comprising said constant voltage device and said second resistor in series, said first terminal of said constant voltage device being connected to said first load terminal, means for deriving a control voltage equal to the difference of the voltage across said constant voltage device and a portion of said load voltage, means responsive to said control voltage for controlling the voltage drop across the emitter-collector path of said first transistor to minimize changes of said load voltage, a second varistor, means comprising said second varistor for connecting the first terminal of said first resistor to the emitter of said second transistor, means for connecting the collector of said second transistor to the second terminal of said constant voltage device, a voltage dividing resistance path connected across said load, means for connecting the emitter-collector path of said third transistor across a portion of said voltage dividing resistance path, the emitter of said third transistor being connected to the second terminal of said first resistor, a third and a fourth resistor, a current path comprising said third and fourth resistors in series connecting the first terminal of said first resistor to the second terminal of said constant voltage device, a condenser, a current path comprising said condenser connecting the common terminal of said third and fourth resistors to the second terminal of said constant voltage device, means for connecting the base of said third transistor to the common terminal of said third and fourth resistors, and means for connecting the base of said second transistor through a portion of said voltage dividing resistance path to the second terminal of said first resistor.

9. Apparatus for supplying current from a direct current supply source to a load comprising a first and a second varistor, a first, a second, a third, a fourth and a fifth transistor each having a collector, an emitter and a base, means comprising said first varistor for connecting the positive terminal of said supply source to the emitter of said first transistor, a first, a second, a third, a fourth, a fifth and a sixth resistor, means for connecting the collector of said first transistor to a first terminal of said first resistor, means for connecting the second terminal of said first resistor to the positive terminal of the load, a first resistive path for connecting the base of said first transistor and the emitter of said second transistor to said positive terminal, a second resistive path for connecting the base of said second transistor and the collector of said third transistor to said positive terminal, means for connecting the collector of said second transistor to the collector of said first transistor, a first voltage divider connected across said load, means for connecting the base of said third transistor to said first voltage divider, a constant voltage device having a first and a second terminal, a shunt path across said load comprising said constant voltage device and said second resistor in series, said first terminal of said constant voltage device being connected to said positive load terminal, means for connecting the emitter of said third transistor and the collector of said fourth transistor to the second terminal of said constant voltage device, means comprising said second varistor for connecting the emitter of said fourth transistor to the first terminal of said first resistor, a second voltage divider comprising said third and fourth resistors connected across said load, means for connecting the base of said fourth transistor to the common terminal of said third and fourth resistors, means for connecting the collector of said fifth transistor to said second voltage divider across said load, means for connecting the emitter of said fifth transistor to said positive load terminal, a current path comprising said fifth and said sixth resistor in series connected across said constant voltage device, means for connecting the base of said fifth transistor to the common terminal of said fifth and sixth resistors, and a condenser connected across said sixth resistor.

References Cited in the file of this patent

UNITED STATES PATENTS

| | | |
|---|---|---|
| 2,697,811 | Deming | Dec. 21, 1954 |
| 2,751,549 | Chase | June 19, 1956 |
| 2,776,382 | Jensen | Jan. 1, 1957 |
| 2,832,900 | Ford | Apr. 29, 1958 |
| 2,888,633 | Carter | May 26, 1959 |
| 2,904,742 | Chase | Sept. 15, 1959 |